(12) United States Patent
Hayashi et al.

(10) Patent No.: US 10,486,401 B2
(45) Date of Patent: Nov. 26, 2019

(54) FABRIC AND METHOD OF PRODUCING THE SAME

(71) Applicants: HONDA GIKEN KOGYO KABUSHIKI KAISHA, Tokyo (JP); SUMINOE TEXTILE CO., LTD., Osaka-shi, Osaka (JP)

(72) Inventors: Rie Hayashi, Wako (JP); Toshimitsu Mizukoshi, Wako (JP); Koichi Tane, Wako (JP); Satoya Matsuda, Nomi (JP); Kuniaki Kondo, Ichinomiya (JP); Yoshitomo Tanaka, Ichinomiya (JP)

(73) Assignees: HONDA GIKEN KOGYO KABUSHIKI KAISHA, Tokyo (JP); SUMINOE TEXTILE CO., LTD., Osaka (JP)

( * ) Notice: Subject to any disclaimer, the term of this patent is extended or adjusted under 35 U.S.C. 154(b) by 97 days.

(21) Appl. No.: 15/499,945

(22) Filed: Apr. 28, 2017

(65) Prior Publication Data
US 2017/0313040 A1    Nov. 2, 2017

(30) Foreign Application Priority Data
Apr. 28, 2016    (JP) .................................. 2016-090448

(51) Int. Cl.
*B32B 27/12*    (2006.01)
*B32B 27/18*    (2006.01)
(Continued)

(52) U.S. Cl.
CPC ............. *B32B 27/12* (2013.01); *B32B 5/02* (2013.01); *B32B 7/02* (2013.01); *B32B 13/08* (2013.01); *B32B 27/18* (2013.01); *B32B 27/40* (2013.01); *B32B 37/16* (2013.01); *B32B 38/164* (2013.01); *D06M 13/08* (2013.01); *B32B 2250/02* (2013.01); *B32B 2255/02* (2013.01); *B32B 2262/0284* (2013.01); *B32B 2307/3065* (2013.01); *B32B 2307/7265* (2013.01);
(Continued)

(58) Field of Classification Search
None
See application file for complete search history.

(56) References Cited

U.S. PATENT DOCUMENTS

| | | | | |
|---|---|---|---|---|
| 2010/0221971 | A1* | 9/2010 | Kubota | C08F 220/24 442/327 |
| 2011/0172336 | A1* | 7/2011 | Nakano | C08F 214/18 524/99 |
| 2011/0229716 | A1* | 9/2011 | Cosyns | C09D 179/02 428/341 |

FOREIGN PATENT DOCUMENTS

| | | |
|---|---|---|
| JP | 03-234870 A | 10/1991 |
| JP | 10-317281 A | 12/1998 |

OTHER PUBLICATIONS

English Abstract of JP 03-234870 A published Oct. 18, 1991.
English Abstract of JP 10-317281 A published Dec. 2, 1998.

\* cited by examiner

*Primary Examiner* — Shawn Mckinnon
(74) *Attorney, Agent, or Firm* — Millen, White, Zelano & Branigan, P.C.

(57) ABSTRACT

A fabric includes a fabric body and a backing resin layer laminated on a rear surface of the fabric body. The fabric body includes a fluorine-containing organic compound adhered to at least the surface thereof, and the fluorine-containing organic compound has six carbon atoms and at least one fluorine atom. The backing resin layer contains a resin, a flame retardant, and an organic fluorine based oil repellent in which the carbon number is six.

7 Claims, 1 Drawing Sheet

(51) Int. Cl.
  *B32B 27/40*    (2006.01)
  *B32B 38/08*    (2006.01)
  *B32B 38/00*    (2006.01)
  *B32B 5/02*     (2006.01)
  *D06M 13/08*    (2006.01)
  *B32B 7/02*     (2019.01)
  *D06M 15/277*   (2006.01)
  *B32B 37/16*    (2006.01)
  *B32B 13/08*    (2006.01)
  *D06M 101/32*   (2006.01)

(52) U.S. Cl.
  CPC ....... *B32B 2367/00* (2013.01); *B32B 2375/00* (2013.01); *B32B 2471/02* (2013.01); *B32B 2601/00* (2013.01); *D06M 2101/32* (2013.01); *D06M 2200/01* (2013.01)

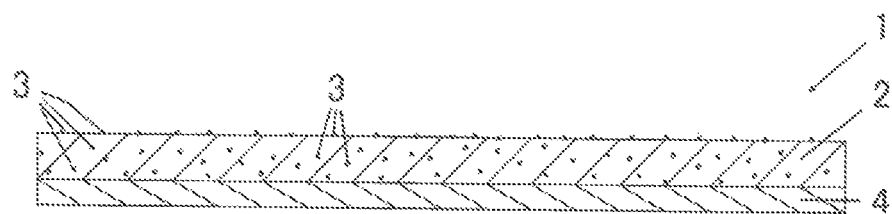

FABRIC AND METHOD OF PRODUCING THE SAME

CROSS-REFERENCE TO THE RELATED APPLICATIONS

The present application claims priority to Japanese Patent Application No. 2016-90448 filed on Apr. 28, 2016, the entire disclosure of which is incorporated herein by reference in its entirety.

BACKGROUND OF THE INVENTION

Filed of the Invention

Some embodiments of the present invention relate to a fabric having sufficient stain resistance and excellent permeation resistance capable of sufficiently preventing permeation of spilled food and drink, etc., even after a time has passed, and also relate to a method of producing the fabric.

Background Technique

The following description of related art sets forth the inventors' knowledge of related art and certain problems therein and should not be construed as an admission of knowledge in the prior art.

Since automobile seats, carpets, etc., get dirty in their surfaces during the use, various types of stain resistant fabrics have been proposed.

A stain resistant synthetic fiber fabric is known in which, for example, a coating layer made of a stain resistant component containing a fluorine based water and oil repellent agent having a hydrophilic segment, a nonhydrophilic fluorine based water and oil repellent agent, and a cross-linking agent is formed on a synthetic fiber, the water repellent durability being third grade or higher, the oil repellent durability being second grade or higher, and the soiling removal durability being third grade or higher (see Patent Document 1: Japanese Unexamined Patent Application Publication No. 10-317281).

Further, a water repellent stain resistant fabric is known in which a synthetic fiber fabric is treated with a water and oil repellent having a fluorine content of 50% by weight or more, and its surface is treated with a polymer compound containing a fluorine atom bonded to a carbon of a main chain having a fluorine content of more than 20% by weight and less than 50% by weight (see Patent Document 2: Japanese Patent Application Publication No. H03-234870).

Although the aforementioned conventional stain resistant fabric can obtain stain resistance on the surface, it cannot prevent drinks, foods, etc., spilled on the fabric from permeating the inside with the lapse of time. In a fabric used for sofas, bed mats, automobile seats, etc., when such permeation into the inside occurs, it permeates even to the rear side of the fabric, so that it permeates the inside pad portion. In this case, this causes a smell since it is difficult to remove it.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Some embodiments of the present invention have been developed in view of the above-mentioned and/or other problems in the related art. Some embodiments of the present invention can significantly improve upon existing methods and/or apparatuses.

The present invention was made in view of the aforementioned technical background. Some embodiments of the present invention relate to a fabric having sufficient stain resistance and excellent permeation resistance capable of sufficiently preventing permeation of spilled foods, drinks, etc., even after a time has passed, and also relate to a method of producing the fabric.

In order to attain the aforementioned objects, some embodiments of the present invention provide the following means.

[1] A fabric comprising:
a fabric body; and
a backing resin layer laminated on a rear surface of the fabric body,
wherein:
the fabric body contains a fluorine-containing organic compound adhered to at least a surface of the fabric body;
the fluorine-containing organic compound contains six carbon atoms and at least one fluorine atom; and
the backing resin layer contains a resin, a flame retardant, and an organic fluorine based oil repellent in which the carbon number is six.

[2] The fabric as recited in the aforementioned Item [1], wherein the fluorine-containing organic compound is 20° C. or higher in glass transition point.

[3] The fabric as recited in the aforementioned Item [1] or [2], wherein the fluorine-containing organic compound is a cationic fluorine-containing organic compound.

[4] The fabric as recited in any one of the aforementioned Items [1] to [3], wherein the organic fluorine based oil repellent is a nonionic organic fluorine based oil repellent or an anionic organic fluorine based oil repellent, or both of the nonionic organic fluorine based oil repellent and the anionic organic fluorine based oil repellent.

[5] The fabric as recited in any one of the aforementioned Items [1] to [4], wherein the fluorine-containing organic compound is in a range of 0.6 parts by mass to 1.8 parts by mass in adhesive amount with respect to 100 parts by mass of the fabric body.

[6] The fabric as recited in any one of the aforementioned Items [1] to [5], wherein the organic fluorine based oil repellent in the backing resin layer is in a range of 0.8 mass % to 7 mass % in content rate.

[7] The fabric as recited in any one of the aforementioned Items [1] to [6], wherein:
the resin configuring the backing resin layer is a urethane resin;
the flame retardant is an ammonium polyphosphate;
a content mass ratio of the urethane resin/the ammonium polyphosphate in the backing resin layer is in a range of 50/50 to 20/80; and
a formation amount of the backing resin layer is 30 g/m$^2$ to 70 g/m$^2$.

[8] A method of producing a fabric, comprising:
immersing a fabric body in a processing solution containing a fluorine-containing organic compound having six carbon atoms and at least one fluorine atom, and then heat-drying the fabric body at a temperature of 100° C. to 225° C.; and laminating a backing resin layer containing a resin, a flame retardant, and an organic fluorine based oil repellent in which the carbon number is six on one surface of the fabric body.

[9] A method of producing a fabric, comprising:

immersing a fabric body in a processing solution containing a fluorine-containing organic compound having six carbon atoms and at least one fluorine atom, and then heat-drying the fabric body at a temperature of 100° C. to 225° C.;

water washing the fabric body after the heat-drying with hot water at a temperature of 70° C. to 100° C., and then drying the fabric body at a temperature of 100° C. to 135° C.; and laminating a backing resin layer containing a resin, a flame retardant, and an organic fluorine based oil repellent in which the carbon number is six on one surface of the fabric body obtained through the washing and the drying.

[10] The method of producing a fabric as recited in the aforementioned Item [8] or [9], wherein the fluorine-containing organic compound is 20° C. or higher in glass transition point.

[11] The method of producing a fabric as recited in any one of the aforementioned Items [8] to [10], wherein after laminating the backing resin layer on one surface of the fabric body, the drying by heating is performed by setting a drying time to 1.6 minutes to 2.6 minutes.

In the embodiment according to the invention as recited in the aforementioned Item [1], since the fluorine-containing organic compound having six carbon atoms and at least one fluorine atom is adhered to at least the surface of the fabric body, sufficient stain resistance as a fabric can be obtained. Furthermore, the specific fluorine-containing organic compound is adhered at least to the surface of the fabric body, and the backing resin layer containing a resin, a flame retardant, and an organic fluorine based oil repellents in which the carbon number is six is adhered to the rear surface of the fabric body. Therefore, when drinks, foods, etc., (it does not matter whether it is aqueous or oily) is spilled on the fabric, it is sufficiently prevented that the foods and drinks are permeated even after a lapse of time, which can secure excellent permeation resistance (infiltration resistance). Further, since the backing resin layer contains a flame retardant, a flame retardant property is given to the fabric.

In the embodiment according to the invention as recited in the aforementioned Item [2], as the fluorine-containing organic compound, a fluorine-containing organic compound having a glass transition point of 20° C. or higher is used. For this reason, permeation resistance (infiltration resistance) can be further improved.

In the embodiment according to the invention as recited in the aforementioned Item [3], since the fluorine-containing organic compound is cationic, the permeation resistance (infiltration resistance) can be further improved.

In the embodiment according to the invention as recited in the aforementioned Item [4], since the organic fluorine based oil repellent is a nonionic organic fluorine based oil repellent or an anionic organic fluorine based oil repellent, or both of the nonionic organic fluorine based oil repellent and the anionic organic fluorine based oil repellent, compatibility with the resin configuring the backing resin layer can be improved, which can further improve permeation resistance (infiltration resistance).

In the embodiment according to the invention as recited in the aforementioned Item [5], since the adhesion amount of the fluorine-containing organic compound is 0.6 parts by mass to 1.8 parts by mass for 100 parts by mass of the fabric body, it is possible to improve the permeation resistance (infiltration resistance) of liquid, etc., and also to secure sufficient flexibility of the fabric.

In the embodiment according to the invention as recited in the aforementioned Item [6], since the content rate of the organic fluorine based oil repellent in the backing resin layer is 0.8 mass % to 7 mass %, it is possible to improve the permeation resistance (infiltration resistance) of liquid, etc.

In the embodiment according to the invention as recited in the aforementioned Item [7], it is possible to further improve the flame retardant and further improve the permeation resistance (infiltration resistance) of liquid, etc.

In the embodiment according to the invention as recited in the aforementioned Item [8] or [9], since the fluorine-containing organic compound having six carbon atoms and at least one fluorine atom can be impregnated into the fabric body and firmly adhered thereto, a fabric with sufficient stain resistance can be produced. Furthermore, the specific fluorine-containing organic compound can be impregnated into the fabric body and strongly adhered thereto and the backing resin layer containing a resin, a flame retardant, and an organic fluorine based oil repellent in which the carbon number is six can be laminated to the rear surface of the fabric body. Therefore, a fabric having excellent permeation resistance (infiltration resistance) capable of sufficiently preventing permeation of foods and drinks even after a lapse of time when drinks, foods, etc., (it does not matter whether it is aqueous or oily) are spilled on the fabric.

In the embodiment according to the invention as recited in the aforementioned Item [9], since the fabric body after the heat-drying is washed with hot water of a temperature of 70° C. to 100° C. and then dried at a temperature of 100° C. to 135° C., a fabric improved in friction fastness can be produced.

In the embodiment according to the invention as recited in the aforementioned Item [10], since the fluorine-containing organic compound having a glass transition point of 20° C. or higher is used as a fluorine-containing organic compound, a fabric further improved in permeation resistance (infiltration resistance) can be further produced.

In the embodiment according to the invention as recited in the aforementioned Item [11], after the lamination of the backing resin layer, drying by heating is performed by setting at a drying time of 1.6 minutes to 2.6 minutes, so it is possible to produce a fabric with reduced glass haze (fogging).

BRIEF DESCRIPTION OF THE DRAWINGS

Some embodiments of the present invention are shown by way of example, and not limitation, in the accompanying FIGURE.

FIG. 1 is a schematic cross-sectional view showing one embodiment of a fabric according to the present invention.

EMBODIMENTS FOR CARRYING OUT THE INVENTION

In the following paragraphs, some embodiments of the present invention will be described by way of example and not limitation. It should be understood based on this disclosure that various other modifications can be made by those in the art based on these illustrated embodiments.

FIG. 1 is a schematic cross-sectional view showing one embodiment of a fabric according to the present invention. In the stain resistant fabric 1 of the present invention, a fluorine-containing organic compound 3 having six carbon atoms and at least one fluorine atom is adhered at least to the surface of the fabric body 2, and a backing resin layer 4 containing a resin, a flame retardant, and an organic fluorine based oil repellent in which the carbon number is six is laminated on the rear surface of the fabric body 2. As the fluorine-containing organic compound, it is preferable to use a fluorine-containing organic compound having a glass transition point (Tg) of 20° C. or higher. In this embodiment, the specific fluorine-containing organic compound 3 is adhered to the entirety of the fabric body 2 (see FIG. 1).

In the aforementioned fabric 1, since the fluorine-containing organic compound 3 having six carbon atoms and at least one fluorine atom is adhered to at least the surface of the fabric body 2, sufficient stain resistance as the fabric 1 can be obtained. Furthermore, the specific fluorine-containing organic compound is adhered to at least the surface of the fabric body 2 and the backing resin layer 4 containing a resin, a flame retardant, and an organic fluorine based oil repellent in which the carbon number is six is laminated to the rear surface of the fabric body. Therefore, a fabric having excellent permeation resistance (infiltration resistance) capable of sufficiently preventing permeation of food and drink even after a lapse of time when drinks, foods, etc., (it does not matter whether it is aqueous or oily) are spilled on the fabric can be secured. Further, since the backing resin layer 4 contains a flame retardant, a flame retardant property is given to the fabric 1.

In the present invention, the fabric body 2 is not particularly limited, and, for example, a pile fabric, a knit fabric, a woven fabric, a nonwoven fabric, etc., can be exemplified. The resin type of the fiber configuring the fabric body 2 is also not particularly limited, and for example, a polyethylene fiber, a polyester fiber, a nylon fiber, a polypropylene fiber, a polyamide fiber, etc., can be exemplified.

The fluorine-containing organic compound is not particularly limited, and, for example, "NK Guard S-0671" (product name) manufactured by Nicca Chemical Co., Ltd. can be exemplified. The "NK guard S-0671" (Tg is 40° C.) is a cationic fluorine-containing organic compound and has crystallinity.

It is preferable that the fluorine-containing organic compound be 20° C. or higher in glass transition point (Tg). When the fluorine-containing organic compound having a Tg of 20° C. or higher is used, the permeation resistance (infiltration resistance) of the fabric 1 can be further improved. In particular, the glass transition point (Tg) of the fluorine-containing organic compound is preferably 20° C. or higher and 60° C. or lower, more preferably 30° C. or higher and 50° C. or lower.

As the fluorine-containing organic compound, a cationic fluorine-containing organic compound is preferably used. When a cationic one is used, permeation resistance (infiltration resistance) can be further improved. Further, the fluorine-containing organic compound is preferably a compound having crystallinity.

It is preferably configured such that the adhesion amount of the fluorine-containing organic compound be in the range of 0.6 parts by mass to 1.8 parts by mass with respect to 100 parts by mass of the fabric body. By being 0.6 parts by mass or more, the permeation resistance (liquid infiltration resistance) of liquid, etc., can be improved, and by being 1.8 parts by mass or less, flexibility of the fabric 1 can be sufficiently secured.

The fluorine-containing organic compound needs to be adhered to at least the surface of the fabric body 2. Among other things, it is preferably configured such that the compound is adhered to the entirety of the fabric body 2. In this case, the permeation resistance (infiltration resistance) of the liquid, etc., can be further improved.

The backing resin layer 4 contains a resin, a flame retardant, and an organic fluorine based oil repellent in which the carbon number is six. The resin configuring the backing resin layer 4 is not particularly limited, and, for example, a urethane resin, an acrylic based resin, and a polyester resin can be exemplified. The flame retardant is not particularly limited. But, for example, ammonium polyphosphate (APP), aluminum phosphate, phosphate ester, melamine polyphosphate, antimony trioxide, decabromodiphenylethane, etc., can be exemplified. The "organic fluorine based oil repellent in which the carbon number is six" is not particularly limited. But, for example, an "Asahi Guard AG-E300D" (nonionic) manufactured by Asahi Glass Co., Ltd., an "Asahi Guard AG-E080" (anionic) manufactured by Asahi Glass Co., Ltd., etc., can be exemplified. The "organic fluorine based oil repellent in which the carbon number of six" is preferably a nonionic organic fluorine based oil repellent or an anionic organic fluorine based oil repellent, or both of the nonionic organic fluorine based oil repellent and the anionic organic fluorine based oil repellent. In this case, the compatibility with the resin configuring the backing resin layer 4 can be improved, which can further improve the permeation resistance (infiltration resistance).

The content rate of the "organic fluorine based oil repellent in which the carbon number is six" in the backing resin layer 4 is preferably in the range of 0.8 mass % to 7 mass %. When the content is 0.8 mass % or more, the permeation resistance (liquid infiltration resistance) of liquid, etc., can be improved, and when it is 7 mass % or less, compatibility with resin can be sufficiently secured.

In particular, it is preferably configured such that the backing resin layer 4 contains a urethane resin, an ammonium polyphosphate, and an organic fluorine based oil repellent in which the carbon number is six. The content mass ratio of the urethane resin/the ammonium polyphosphate in the backing resin layer (dried) is preferably in the range of 50/50 to 20/80, more preferably in the range of 40/60 to 30/70. The formation amount of the backing resin layer 4 is preferably 35 g/m$^2$ to 70 g/m$^2$.

Preferred examples of the method of producing the fabric according to the present invention will now be described. First, the fabric body is immersed in a processing solution containing a fluorine-containing organic compound having six carbon atoms and at least one fluorine atom, and then the fabric body is squeezed with a mangle, etc. Then, the fabric body is heat-dried at a temperature of 100° C. to 225° C. (Immersion Step). By setting the temperature to 100° C. or higher, it is possible to impart sufficient water and oil repellency, and by setting the temperature to 225° C. or lower, the adverse effect (heat embrittlement, etc.) by heat on the fabric body 2 can be prevented. The heat-drying time in the immersion step is preferably from 1.0 minutes to 2.6 minutes. By setting the heat-drying time to 1.0 minutes or more, the fabric can be sufficiently dried, and by setting it to 2.6 minutes or less, the manufacturing efficiency (productivity) can be improved. Among them, as the fluorine-containing organic compound, it is preferable to use a fluorine-containing organic compound having a glass transition point of 20° C. or higher.

The processing solution contains the specific fluorine-containing organic compound, but usually contains water as well. It is preferable to contain a crosslinking agent in the processing solution. By making such a crosslinking agent contain, there is an advantage that water repellency and friction fastness can be improved. The content rate of the specific fluorine-containing organic compound in the processing solution is preferably set within a range of 1 mass % to 4 mass %.

Next, the fabric body after the heat-drying is water washed with hot water at a temperature of 70° C. to 100° C., and then the fabric body is dried at a temperature of 100° C. to 135° C. (Hot Water Washing Step). The temperature of the hot water at the hot water washing is preferably set at 70° C. to 100° C. By setting the temperature to 70° C. or higher, sufficient washing can be performed to improve the friction fastness. By setting the temperature to 100° C. or lower, deterioration of the texture can be prevented and the change in color can also be sufficiently prevented. The drying temperature of the fabric body after hot water washing is preferably set to 100° C. to 135° C. By setting the temperature to 100° C. or higher, the fabric can be sufficiently dried. By setting the temperature to 135° C. or lower, deterioration of friction fastness can be decreased.

Next, the backing resin layer containing a resin, a flame retardant, and an organic fluorine based oil repellent in which the carbon number is six is laminated on one surface of the fabric body obtained through the aforementioned hot washing and drying as described above (Backing Coating Step) to obtain a fabric 1 of the present invention.

The lamination method is not particularly limited, but, for example, a knife coating method, a kiss roll coating method, a screen printing method, etc., can be exemplified.

In laminating the backing resin layer, for example, a backing resin composition is prepared and applied to one surface of the fabric body. As the backing resin composition, it is preferable to use an aqueous resin emulsion containing water, a resin, a flame retardant and an organic fluorine based oil repellent in which the carbon number is six.

The content rate of the resin in the water-based resin emulsion is preferably 5 mass % to 15 mass %. The content rate of the flame retardant in the water-based resin emulsion is preferably 9 mass % to 25 mass %. In this case, the flame retardant can be uniformly dispersed, and the flame retardant property can be sufficiently secured.

The content rate of the "organic fluorine based oil repellent in which the carbon number is six" in the water-based resin emulsion is preferably 1.3 mass % to 9 mass %. When it is 1.3 mass % or more, sufficient permeation resistance can be secured, and when it is 9 mass % or less, sufficient flame retardant can be secured.

As described above, after laminating the backing resin layer on one surface of the fabric body, it is preferable to perform drying by heating, and its heat-drying time is preferably set to 1.6 minutes to 2.6 minutes. By setting it to 1.6 minutes or more, a fabric with a reduced degree of glass haze can be obtained, and by setting it to 2.6 minutes or less, production efficiency can be improved.

The method of production exemplified above is merely a preferable example thereof, and the fabric 1 of the present invention is not limited to one produced by such a method of production.

EXAMPLES

Next, specific examples of the present invention will be described, but the present invention is not particularly limited to those of these examples.

Example 1

A polyethylene terephthalate (PET) fabric body obtained by dyeing black with a liquid flow dyeing machine, reducing washing, and then drying was immersed in an aqueous processing solution containing 7 mass % of "NK GUARD S-0671" (fluorine-containing organic compound A) manufactured by Nicca Chemical Co., 0.7 mass % of an isocyanate crosslinking agent, and 92.3 mass % of water for 3 seconds. Thereafter, the fabric body was removed from the aqueous processing solution. Next, after squeezing the fabric body with a mangle, heat-drying was carried out at 150° C. for 1.5 minutes (Immersion Step). The pick up of the processing solution was 55 mass %.

Next, the fabric body passed the immersion step was subjected to water washing (hot water washing) with hot water at a temperature of 80° C. for 1 minute and then heat-dried at 130° C. for 1.5 minutes (Hot Water Washing Step).

Next, an aqueous emulsion solution containing 16.4 mass % of ammonium polyphosphate (APP), 7 mass % of a urethane resin, 3 mass % of an organic fluorine based oil repellent ("ASAHI GUARD AG-E080 (anionic)" manufactured by Asahi Glass Company, Limited) 70.6 mass % of water, and 3 mass % of a thickener was applied to one surface of the fabric body obtained through the hot water washing step by a knife coating method, and then heat-dried at 130° C. for 1.9 minutes to form a backing resin layer. Thus, a stain resistant fabric 1 was obtained (Backing Coating Step).

In the obtained stain resistant fabric 1, the adhesion amount of the fluorine-containing organic compound A was 1.12 parts by mass with respect to 100 parts by mass of the PET fabric body (fabric body after reduction cleaning and before immersion in an aqueous processing solution), and the backing resin layer had an adhesion amount (backing resin layer formation amount) of 40 g/m$^2$.

Example 2

A stain resistant fabric 1 was obtained in the same manner as in Example 1 except that the adhesion amount (dry state) of the fluorine-containing organic compound A (Tg: 40° C.) was set to 0.68 parts by mass by making the degree of drawing by a mangle stronger than in Example 1.

Example 3

A stain resistant fabric 1 was obtained in the same manner as in Example 1 except that an aqueous emulsion solution containing 16.4 mass % of ammonium polyphosphate (APP), 7 mass % of urethane resin, 9 mass % of an organic fluorine based oil repellent ("ASAHI GUARD AG-E080 (anionic)" manufactured by Asahi Glass Company, Limited) 64.6 mass % of water, and 3 mass % of a thickener was used as an aqueous emulsion solution.

Example 4

A stain resistant fabric 1 was obtained in the same manner as in Example 1 except that an aqueous emulsion solution containing 14.1 mass % of ammonium polyphosphate (APP), 9.4 mass % of urethane resin, 3 mass % of an organic fluorine based oil repellent ("ASAHI GUARD AG-E080 (anionic)" manufactured by Asahi Glass Company, Limited) 70.5 mass % of water, and 3 mass % of a thickener was used as an aqueous emulsion solution. In the obtained stain resistant fabric 1, the adhesion amount of backing resin layer (backing resin layer formation amount) was 35 g/m$^2$.

Example 5

A stain resistant fabric 1 was obtained in the same manner as in Example 1 except that the temperature of the washing water in the hot water washing step was set at 70° C. and the heat dry temperature after hot water washing was set at 135° C.

Example 6

A stain resistant fabric 1 was obtained in the same manner as in Example 1 except that the heat-drying time in the backing coating step was set to 1.6 minutes.

Example 7

A stain resistant fabric 1 was obtained in the same manner as in Example 1 except that a fluorine-containing organic compound B (Tg: 38° C.) having six carbon atoms and at least one fluorine atom was used in place of the fluorine-containing organic compound A (Tg: 40° C.)

Example 8

A stain resistant fabric 1 was obtained in the same manner as in Example 1 except that a fluorine-containing organic compound C (Tg: 43° C.) having six carbon atoms and at least one fluorine atom was used in place of the fluorine-containing organic compound A (Tg: 40° C.)

Comparative Example 1

A stain resistant fabric was obtained in the same manner as in Example 1 except that an aqueous processing solution containing 7.7 mass % of an isocyanate crosslinking agent and 92.3 mass % of water was used as an aqueous processing solution.

TABLE 1

|  |  | Ex. 1 | Ex. 2 | Ex. 3 | Ex. 4 | Ex. 5 | Ex. 6 |
|---|---|---|---|---|---|---|---|
| Immersion step | Fluorine-containing organic compound (Type/Tg) | A/40° C. | A/40° C. | A/40° C. | A/40° C. | A/40° C. | A/40° C. |
|  | Heat-drying temperature (° C.) | 150 | 150 | 150 | 150 | 150 | 150 |
|  | Attached amount (parts by mass) of organic compound | 1.12 | 0.68 | 1.12 | 1.12 | 1.12 | 1.12 |
| Hot water washing step | Temp. of washing hot water (° C.) | 80 | 80 | 80 | 80 | 70 | 80 |
|  | Heat-drying temp. (° C.) | 130 | 130 | 130 | 130 | 135 | 130 |
| Backing coating step | Type (resin/flame retardant) | Urethane/APP | Urethane/APP | Urethane/APP | Urethane/APP | Urethane/APP | Urethane/APP |
|  | Mass ratio (resin/flame retardant) | 30/70 | 30/70 | 30/70 | 40/60 | 30/70 | 30/70 |
|  | Backing resin layer forming amount (g/m$^2$) | 40 | 40 | 40 | 35 | 40 | 40 |
|  | Heat-drying temp. (° C.) | 130 | 130 | 130 | 130 | 130 | 130 |
|  | Heat-drying time (min.) | 1.9 | 1.9 | 1.9 | 1.9 | 1.9 | 1.6 |
|  | Organic fluorine based oil repellent content rate (mass %) | 1.9 | 1.9 | 5.6 | 1.9 | 1.9 | 1.9 |
| Evaluation | Stain resistance | ○ | ○ | ○ | ○ | ○ | ○ |
|  | Permeance resistance | ○ | ○ | ○ | ○ | ○ | ○ |
|  | flame retardance | ○ | ○ | ○ | ○ | ○ | ○ |
|  | friction fastness | ○ | ○ | ○ | ○ | ○ | ○ |
|  | Fogging test | ○ | ○ | ○ | ○ | ○ | ○ |

TABLE 2

|  |  | Ex. 7 | Ex. 8 | Comp. Ex. 1 |
|---|---|---|---|---|
| Immersion step | Fluorine-containing organic compound (Type/Tg) | B/38° C. | C/43° C. | — |
|  | Heat-drying temperature (° C.) | 150 | 150 | 150 |
|  | Attached amount (parts by mass) of organic compound | 1.12 | 1.12 | 1.12 |
| Hot water washing step | Temp. of washing hot water (° C.) | 80 | 80 | 80 |
|  | Heat-drying temp. (° C.) | 130 | 130 | 130 |
| Backing coating step | Type (resin/flame retardant) | Urethane/APP | Urethane/APP | Urethane/APP |
|  | Mass ratio (resin/retardant) | 30/70 | 30/70 | 30/70 |
|  | Backing resin layer forming amount (g/m$^2$) | 40 | 40 | 40 |
|  | Heat-drying temp. (° C.) | 130 | 130 | 130 |

TABLE 2-continued

|  |  | Ex. 7 | Ex. 8 | Comp. Ex. 1 |
|---|---|---|---|---|
|  | Heat-drying time (min.) | 1.9 | 1.9 | 1.9 |
|  | Organic fluorine based oil repellent content rate (mass %) | 1.9 | 1.9 | 1.9 |
| Evaluation | Stain resistance | ○ | ○ | X |
|  | Permeance resistance | ○ | ○ | X |
|  | Retardant | ○ | ○ | ○ |
|  | Friction fastness | ○ | ○ | ○ |
|  | Fogging test | ○ | ○ | ○ |

Performance evaluation was performed on each of the stain resistant fabrics obtained as described above based on the following evaluation method. The results are shown in Tables 1 and 2. In Table 1 and 2, the "organic fluorine based oil repellent content rate" is the content rate (mass %) of the organic fluorine based oil repellent in the backing resin layer (backing resin layer after drying) of the obtained stain resistant fabric, and it is not the organic fluorine based oil repellent content rate in the aqueous emulsion liquid.

<Stain Resistant Evaluation Method>

Oil was dropped on the surface of the stain resistant fabric, and after the drip (oil) was wiped off with a dry waste cloth, stain resistant of the wiped surface was evaluated using a contamination gray scale. That is, those judged to be Grade 4 or Grade 5 on the gray scale for contamination are shown as "○" (pass), and those judged to be Grade 1, 2, or 3 in contamination gray scale are shown as "x".

<Permeation Resistance Evaluation Method>

Oil was dropped on the surface of the stain resistant fabric and allowed to stand for 24 hours at ambient temperature and 80° C. atmosphere, respectively. Then, the rear side of the stain resistant fabric was observed to check the presence or absence of oil penetration. Further, water was dropped on the surface of the stain resistant fabric and allowed to stand at ambient temperature and 80° C. for 24 hours, respectively. Then, the rear surface of the stain resistant fabric was observed to check the presence or absence of water permeation. In both of the test using oil and the test using water, those which did not permeate to the rear side of the stain resistant fabric are shown as "○" (pass), and at least in any of the tests, those which permeated to the rear side of the stain resistant fabric are shown as "x".

<Flame Retardant Evaluation Method>

A combustibility test (flame retardant test) was conducted in accordance with FMVSS 302 (Federal Motor Vehicle Safety Standard No. 302) (Combustion Test for Automotive Interior Materials), and those that passed this test are shown as "○" (pass), and those which did not pass are shown as "x".

<Friction Fastness Evaluation Method>

In accordance with JIS L0849-2013, a friction fastness test by a dry cloth and a friction fastness test by a wet cloth in which water was replaced with artificial sweat liquid were conducted, then the surface of each fabric was evaluated for friction fastness using a contamination gray scale. In the dry cloth test and the wet cloth test, those judged to be Grade 4 or Grade 5 are judged as "○" (Pass), and in at least one of the dry cloth test and the poultice test, those judged to be Grade 1, 2, or 3 are shown as "x".

<Fogging Test Method>

A fogging test was conducted according to JASO M 313-83 and JIS K7136-2000. Those having a haze value of 5% or less are shown as "○" (Pass), and those having a haze value exceeding 5% are shown as "x".

As is apparent from Tables 1 and 2, the stain resistant fabrics of Examples 1 to 8 of the present invention could secure sufficient stain resistant and sufficient permeation resistance, and good flame retardant was obtained.

In contrast, in the stain resistant fabric of Comparative Example 1, stain resistant was insufficient and the permeation resistance was not good.

INDUSTRIAL APPLICABILITY

The fabric according to the present invention and the fabric produced according to the production method of the present invention can be used as an interior material for a vehicle, such as an interior material for an automobiles, exemplified by an automobile sheet, or interior furniture such as a sofa, a bed mat, and a chair sheet, but not particularly limited to these exemplified applications.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. Limitations in the claims are to be interpreted broadly based on the language employed in the claims and not limited to examples described in the present specification or during the prosecution of the application, which examples are to be construed as non-exclusive.

DESCRIPTION OF REFERENCE SYMBOLS 1 stain resistant fabric
2 fabric body
3 adhered substance (fluorine-containing organic compound)
4 backing resin layer

The invention claimed is:

1. A fabric comprising:
   a fabric body; and
   a backing resin layer applied to a rear surface of the fabric body,
   wherein:
   the fabric body contains a fluorine-containing organic compound adhered to at least a surface of the fabric body;
   and the backing resin layer comprises a urethane resin, an ammonium polyphosphate flame retardant, and an anionic or nonionic organic fluorine based oil repellent, wherein a content mass ratio of the urethane resin/the ammonium polyphosphate in the backing resin layer is in a range of 50/50 to 20/80; and a formation amount of the backing resin layer is 30 g/m$^2$ to 70 g/m$^2$.

2. The fabric as recited in claim 1, wherein the fluorine-containing organic compound is in a range of 0.6 parts by mass to 1.8 parts by mass in adhesive amount with respect to 100 parts by mass of the fabric body.

3. The fabric as recited in claim 1, wherein the organic fluorine based oil repellent in the backing resin layer is in a range of 0.8 mass % to 7 mass % in content rate.

4. A method of producing a fabric, comprising:
immersing a fabric body in a processing solution containing a fluorine-containing organic compound, and then heat-drying the fabric body at a temperature of 100° C. to 225° C.; and
applying a backing resin layer comprising a urethane resin, an ammonium polyphosphate flame retardant, and an anionic or nonionic organic fluorine based oil repellent on one surface of the fabric body,
wherein a content mass ratio of the urethane resin/the ammonium polyphosphate in the backing resin layer is in a range of 50/50 to 20/80; and a formation amount of the backing resin layer is 30 g/m$^2$ to 70 g/m$^2$.

5. A method of producing a fabric, comprising:
immersing a fabric body in a processing solution containing a fluorine-containing organic compound and then heat-drying the fabric body at a temperature of 100° C. to 225° C.;
water washing the fabric body after the heat-drying with hot water at a temperature of 70° C. to 100° C., and then drying the fabric body at a temperature of 100° C. to 135° C.; and
applying a backing resin layer containing a urethane resin, an ammonium polyphosphate flame retardant, and an anionic or nonionic organic fluorine based oil repellent on one surface of the fabric body obtained through the washing and the drying,
wherein a content mass ratio of the urethane resin/the ammonium polyphosphate in the backing resin layer is in a range of 50/50 to 20/80; and a formation amount of the backing resin layer is 30 g/m$^2$ to 70 g/m$^2$.

6. The method of producing a fabric as recited in claim 4, wherein after laminating the backing resin layer on one side of the fabric body, the drying by heating is performed by setting a drying time to 1.6 minutes to 2.6 minutes.

7. The method of producing a fabric as recited in claim 5, wherein after applying the backing resin layer on one side of the fabric body, the drying by heating is performed by setting a drying time to 1.6 minutes to 2.6 minutes.

\* \* \* \* \*